United States Patent
Poirier (10) Patent No.: US 8,400,671 B2
(45) Date of Patent: Mar. 19, 2013

(54) SYSTEM AND METHOD FOR SELECTIVELY DISABLING DOCUMENT RENDERING

(75) Inventor: Arthur J. Poirier, North Narrabeen (AU)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1463 days.

(21) Appl. No.: 11/747,064

(22) Filed: May 10, 2007

(65) Prior Publication Data

US 2008/0278769 A1 Nov. 13, 2008

(51) Int. Cl.
*G06K 15/22* (2006.01)

(52) U.S. Cl. ....... 358/1.3; 358/1.13; 358/1.15; 358/406; 347/19; 382/276

(58) Field of Classification Search .................... 358/1.3, 358/1.13, 1.14, 406; 349/19; 382/276
See application file for complete search history.

(56) References Cited

U.S. PATENT DOCUMENTS

| 5,034,770 | A * | 7/1991 | O'Connell ...................... 399/79 |
| 7,099,026 | B1 | 8/2006 | Hren |
| 7,136,941 | B2 | 11/2006 | Nguyen et al. |
| 2003/0053815 | A1 | 3/2003 | Testardi et al. |
| 2003/0133141 | A1 * | 7/2003 | Toda et al. .................... 358/1.13 |
| 2003/0137687 | A1 * | 7/2003 | Onuma ......................... 358/1.14 |
| 2003/0151760 | A1 * | 8/2003 | Berndt et al. ................ 358/1.14 |
| 2003/0154383 | A9 * | 8/2003 | Wiley et al. .................... 713/189 |
| 2003/0160992 | A1 | 8/2003 | Weaver |
| 2003/0174360 | A1 | 9/2003 | Ohshima |
| 2004/0034582 | A1 * | 2/2004 | Gilliam et al. ................. 705/31 |
| 2005/0094193 | A1 | 5/2005 | Oswald |
| 2006/0072782 | A1 * | 4/2006 | Abe et al. ...................... 382/100 |
| 2006/0088160 | A1 * | 4/2006 | Brown et al. ................... 380/51 |
| 2007/0024895 | A1 | 2/2007 | Clark |
| 2007/0091356 | A1 * | 4/2007 | Kremer ......................... 358/1.15 |
| 2007/0171448 | A1 * | 7/2007 | Liu .............................. 358/1.13 |
| 2008/0180728 | A1 * | 7/2008 | Sekine ......................... 358/1.15 |

* cited by examiner

*Primary Examiner* — Jacky X Zheng
(74) *Attorney, Agent, or Firm* — SoCal IP Law Group LLP; Steven C. Sereboff; Jonathan P. Pearce (57) ABSTRACT

The subject application is directed to a system and method for selectively disabling document rendering. An electronic document is first generated having a customized operator. The generated electronic document is then communicated to an associated document rendering device. The generated electronic document is received by the associated document rendering device and the customized operator is parsed and executed so as to secure identification data representing an identity of the documents rendering device. The identification data is then tested. An output of a document rendering operation is then controlled in accordance with an output of testing of the identification data.

12 Claims, 5 Drawing Sheets

SYSTEM AND METHOD FOR SELECTIVELY DISABLING DOCUMENT RENDERING

BACKGROUND OF THE INVENTION

The subject application is directed to the general rendering of electronic documents. The subject application is particularly applicable to selective rendering of electronic documents in accordance with identification information relative to a document rendering device to which an electronic document is communicated.

Many applications currently result in generation of electronic documents. Such applications include word processing, scanning, computer aided design, image processing, photo editing, facsimile transmission, drawing, and the like. Many standard formats exist for storing and transmission of such electronic documents, including representative formats such as Adobe PostScript, Microsoft Word, Microsoft Excel, as well as many other formats as will be understood by one of ordinary skill in the art.

Document rendering devices, such as printers, frequently employ raster bit-mapped image output, such as is realized by laser printers, ink jet printers, dot matrix printers, and the like. Such document rendering devices may include associated drivers, which function to take electronic documents from an associated application and convert them to a format compatible with a particular device or set of devices. As document rendering devices continue to evolve, embedded raster image processors have an ability to receive and render documents in other formats, such as directly importing PostScript files. It may not always be desirable to allow certain files to be processed by a myriad of document processing devices

SUMMARY OF THE INVENTION

In accordance with one embodiment of the subject application, there is provided a system and method for rendering of electronic documents.

Further, in accordance with one embodiment of the subject application, there is provided a system and method for selective rendering of electronic documents in accordance with identification information relative to a document rendering device to which an electronic document is communicated.

Still further, in accordance with one embodiment of the subject application, there is provided a system for selectively disabling document rendering. The system comprises means adapted for generating an electronic document inclusive of a custom operator and means adapted for communicating a generated electronic document to an associated document rendering device. The system also includes means adapted for receiving the generated electronic document and means adapted for parsing and executing the custom operator, so as to secure identification data representative of an identity of the document rendering device. The system further includes testing means adapted for testing identification data and output control means adapted for controlling an output of a document rendering operation in accordance with an output of the testing means.

In one embodiment of the subject application, the testing means includes means adapted for testing identification data in accordance with at least one preselected machine characteristic.

In another embodiment of the subject application, the machine characteristic includes data representative of a manufacturer of the document rendering device. In one such embodiment of the subject application, the output control means includes means adapted for generating an error page in accordance with an output of the testing means.

In yet another embodiment of the subject application, the output control means includes means adapted for selectively rendering the electronic document in accordance with an output of the testing means.

In another embodiment of the subject application, the electronic document is generated in POSTSCRIPT form, and wherein the operator is comprised of at least one customized POSTSCRIPT operator.

Still further, in accordance with one embodiment of the subject application, there is provided a method for selectively disabling document rendering in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for rendering of electronic documents. In particular, the subject application is directed to a system and method for selective rendering of electronic documents in accordance with identification information relative to a document rendering device, to which an electronic document is communicated. It will become apparent to those skilled in the art that the system and method described herein are suitably adapted to a plurality of varying electronic fields employing remote enablement of processing features, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
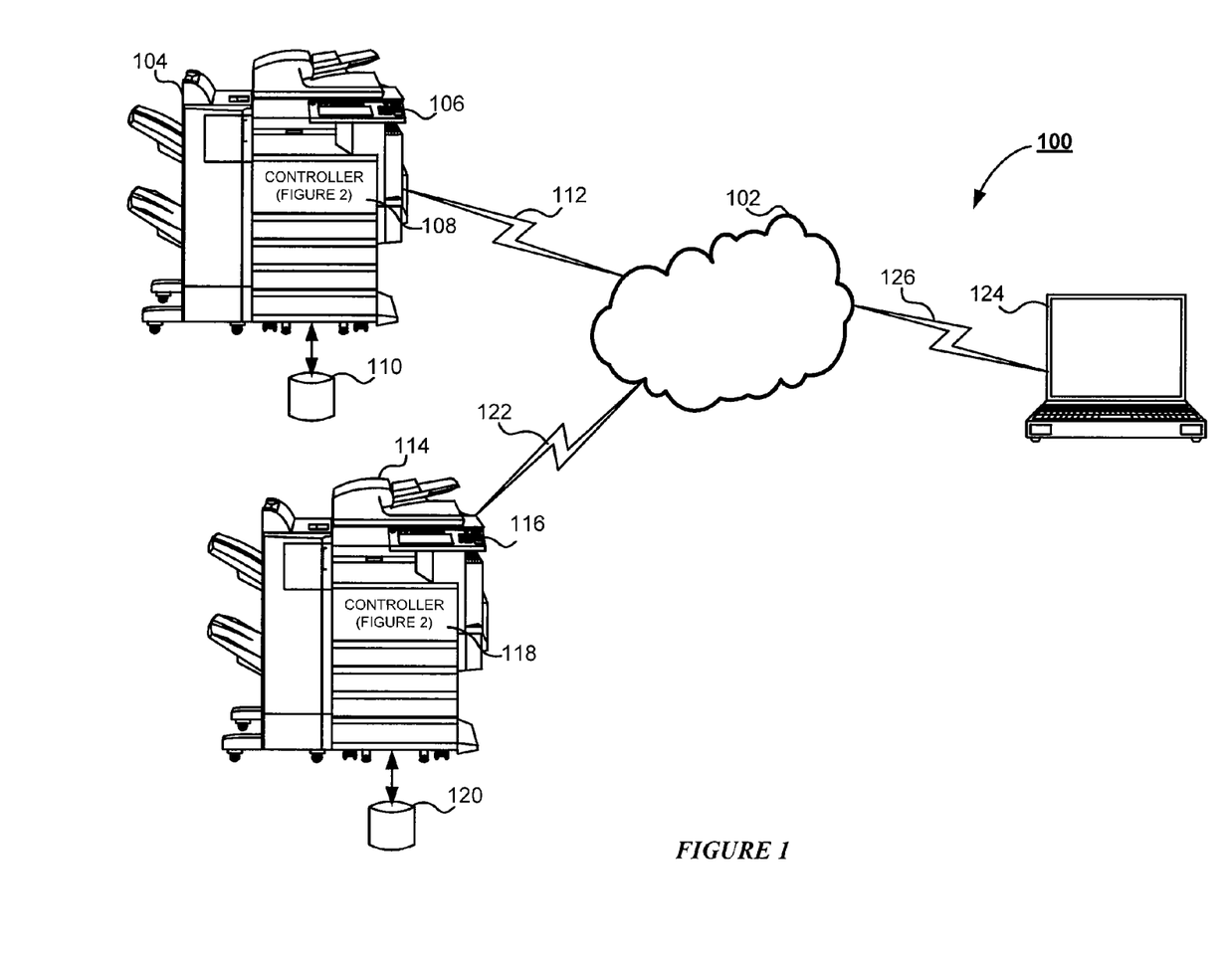
FIG. 1 is an overall diagram of a system for selectively disabling document rendering according to one embodiment of the subject application.

Referring now to FIG. 1, there is shown an overall diagram of a system 100 for selectively disabling document rendering in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a first document rendering device 104 and a second document rendering device 114, which are depicted in FIG. 1 as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document rendering devices include, for example and without limitation, the Toshiba e-Studio Series Controller. In accordance with one aspect of the subject application, the first document rendering device 104 and the second document rendering device 114 are suitably adapted to provide remote document processing services to external or network devices. Preferably, the document rendering devices 104 and 114 include hardware, software, and any suitable combination thereof, configured to interact with an associated user, a networked device, or the like.

According to one embodiment of the subject application, the first document rendering device 104 and the second document rendering device 114 are suitably equipped to receive a plurality of portable storage media, including, without limitation, Firewire drive, USB drive, SD, MMC, XD, Compact Flash, Memory Stick, and the like. In the preferred embodiment of the subject application, the first document rendering device 104 and the second document rendering device 114 further include associated user interfaces 106 and 116, respectively, such as a touch-screen, LCD display, touch-panel, alpha-numeric keypad, or the like, via which an associated user is able to interact directly with the corresponding document rendering device 104 or 114. In accordance with the preferred embodiment of the subject application, the user interfaces 106 and 116 are advantageously used to communicate information to the associated user and receive selections from the associated user. The skilled artisan will appreciate that the user interfaces 106 and 116 are comprised of various components, suitably adapted to present data to the associated user, as are known in the art. In accordance with one embodiment of the subject application, the user interfaces 106 and 116 comprise a display, suitably adapted to display one or more graphical elements, text data, images, or the like, to an associated user, receive input from the associated user, and communicate the same to a backend component, such as the controllers 108 and 118, as explained in greater detail below. Preferably, the first document rendering device 104 is communicatively coupled to the computer network 102 via a suitable communications link 112 and the second document rendering device 114 is coupled to the computer network 102 via a suitable communications link 122. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the first document rendering device 104 and the second document rendering device 114 further each incorporate a backend component, designated as the controller 108 and the controller 118, suitably adapted to facilitate the operations of the corresponding document rendering devices 104 and 114, as will be understood by those skilled in the art. Preferably, the controllers 108 and 118 are embodied as hardware, software, or any suitable combination thereof, configured to control the operations of the associated document rendering devices 104 and 114, facilitate the display of images via the user interfaces 106 and 116, direct the manipulation of electronic image data, and the like. For purposes of explanation, the controllers 108 and 118 are used to refer to any myriad of components associated with the document rendering devices 104 and 114, including hardware, software, or combinations thereof, functioning to perform, cause to be performed, control, or otherwise direct the methodologies described hereinafter. It will be understood by those skilled in the art that the methodologies described with respect to the controllers 108 and 118 are capable of being performed by any general purpose computing system, known in the art, and thus the controllers 108 and 118 are representative of such general computing devices and is intended as such when used hereinafter. Furthermore, the use of the controllers 108 and 118 hereinafter are for the example embodiment only, and other embodiments, which will be apparent to one skilled in the art, are capable of employing the system and method for selectively disabling document rendering of the subject application. The functioning of the controllers 108 and 118 will better be understood in conjunction with the block diagrams illustrated in FIGS. 2 and 3, explained in greater detail below.

Communicatively coupled to the document rendering devices 104 and 114 are data storage devices 110 and 120, respectively. In accordance with the preferred embodiment of the subject application, the data storage devices 110 and 120 are any mass storage devices known in the art including, for example and without limitation, magnetic storage drives, a hard disk drive, optical storage devices, flash memory devices, or any suitable combination thereof. In the preferred embodiment, the data storage devices 110 and 120 are suitably adapted to store document data, image data, electronic database data, application data, or the like. It will be appreciated by those skilled in the art that while illustrated in FIG. 1 as being separate components of the system 100, the data storage devices 110 and 120 are capable of being implemented as internal storage components of the respective document rendering devices 104 and 114, components of the controllers 108 and 118, or the like, such as, for example and without limitation, an internal hard disk drive, or the like.

The system 100 illustrated in FIG. 1 further depicts a user device 124, in data communication with the computer network 102 via a communications link 126. It will be appreciated by those skilled in the art that the user device 124 is shown in FIG. 1 as a laptop computer for illustration purposes only. As will be understood by those skilled in the art, the user device 124 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 126 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 124 is suitably adapted to generate and transmit electronic documents, document processing instructions, user interface modifications, upgrades, updates, personalization data, or the like, to the first document rendering device 104, the second document rendering device 114, or any other similar device coupled to the computer network 102. In accordance with one embodiment of the subject application, the user device 124 includes an output driver suitably adapted to output electronic document data in POSTSCRIPT format. In such an embodiment, the software driver is further adapted to communicate POSTSCRIPT operators to an associated document rendering device 104 or 114.

Figure 2:
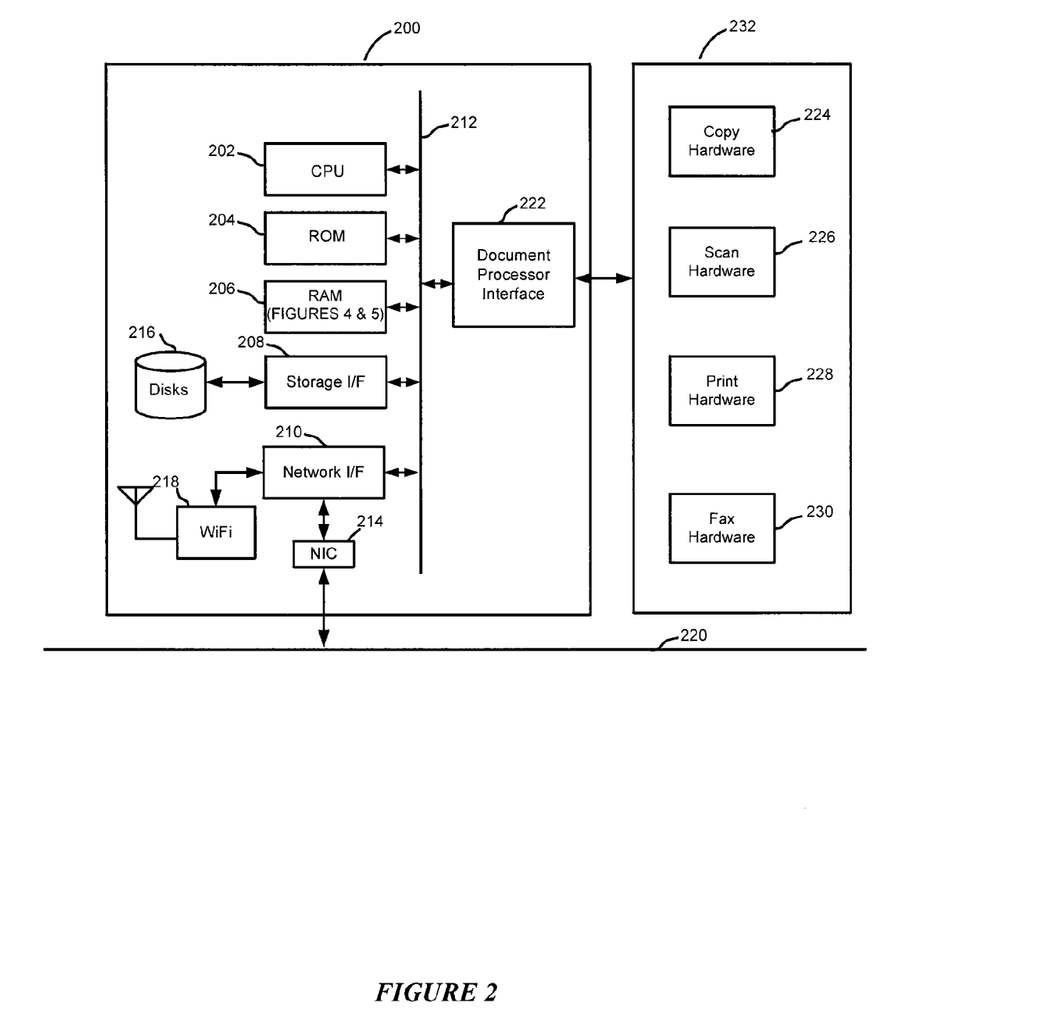
FIG. 2 is a block diagram illustrating controller hardware for use in the system for selectively disabling document rendering according to one embodiment of the subject application.

Turning now to FIG. 2, illustrated is a representative architecture of a suitable backend component, i.e., the controller 200, shown in FIG. 1 as the controller 108 and the controller 118, on which operations of the subject system 100 are completed. The skilled artisan will understand that the controllers 108 and 118 are representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
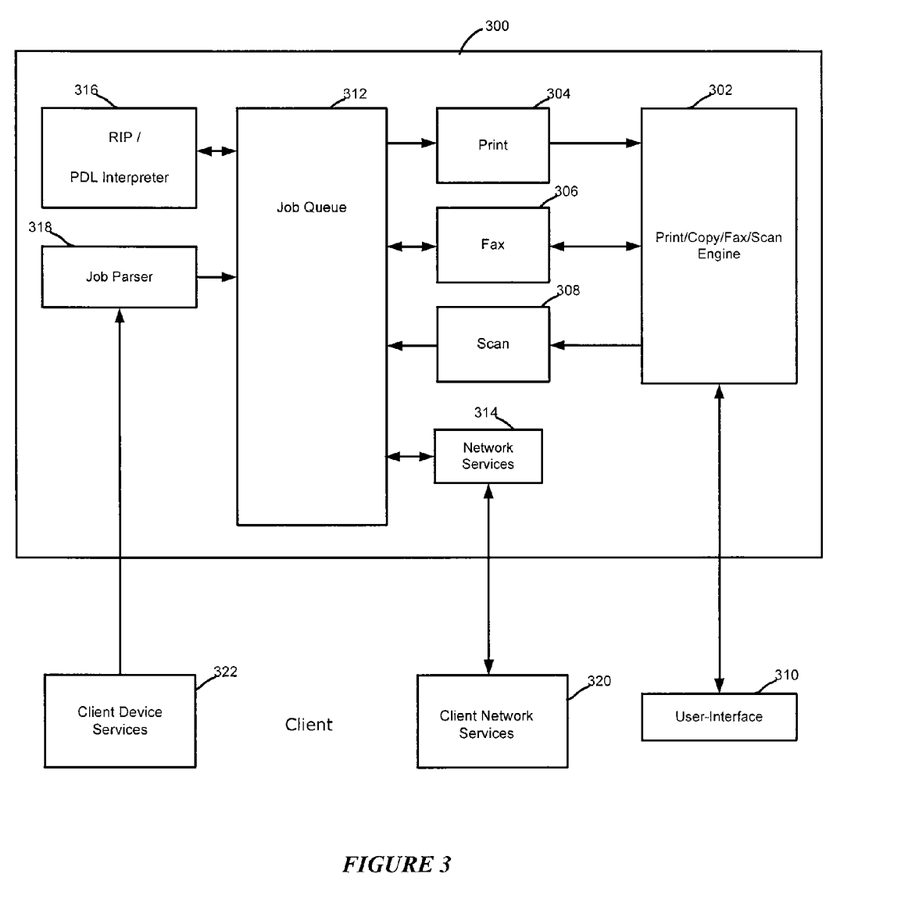
FIG. 3 is a functional diagram illustrating the controller for use in the system for selectively disabling document rendering according to one embodiment of the subject application.

Functionality of the subject system 100 is accomplished on a suitable document processing device, such as the document processing devices 104 and 114, which includes the controller 200 of FIG. 2, (shown in FIG. 1 as the controller 108 and the controller 118) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purpose document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a page description language interpreter and a raster image processor, or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The Parser 318 functions to interpret a received electronic document file and relay it to the job queue 312 for handling in connection with the afore-described functionality and components.

In operation, an electronic document is first generated inclusive of a customized Page Description Language (PDL) operator. The generated electronic document is then communicated to an associated document rendering device. The generated electronic document is then received by the associated document rendering device. The operator is then parsed and executed so as to secure identification data representing an identity of the documents rendering device. The identification data is then tested by comparing the data with a predefined set of identification data related to the document rendering device. An output of a document rendering operation is then controlled in accordance with an output of testing of the identification data.

In accordance with one example embodiment of the subject application, an electronic document is generated at the user device 124 via a suitable application resident thereon. Preferably, the electronic document is included in a document processing request destined for at least one of the document rendering devices 104 or 114 via the computer network 102. In accordance with one embodiment of the subject application, the electronic document is in POSTSCRIPT format and includes at least one customized POSTSCRIPT operator. As will be understood by those skilled in the art, POSTSCRIPT is a page description language as well as a programming language. As such, the language is capable of defining content as well as behavior of associated document rendering devices. Thus, the customized POSTSCRIPT operator is representative of a command to the receiving document rendering device 104 or 114 to process content, perform actions, report errors, force an exit from processing, and the like. Preferably, the operator is generated by an associated software driver resident on the user device 124 and inserted into the POSTSCRIPT print stream.

The electronic document, inclusive of the associated customized POSTSCRIPT operator, is then communicated to the first document rendering device 104 or the second document rendering device 114, via the computer network 102. For purposes of example only, the first document rendering device 104 is deemed a compatible document rendering device, i.e., the first document rendering device 104 is manufactured by an authorized manufacturer. In contrast, and in accordance with such an example, the second document processing device 114 is not a compatible document rendering device, i.e., it is not manufactured by an authorized manufacturer and as such, is not allowed, by the associated driver, to perform preselected operations or options contained within the POSTSCRIPT print stream.

When the first document rendering device 104 receives the electronic document and associated POSTSCRIPT operator, the operator is enabled, for example by a raster image processor associated with the first document rendering device 104, the controller 108, or other suitable component associated with the first document rendering device 104. Upon parsing and execution of the POSTSCRIPT operator, identification data associated with the first document rendering device 104 is secured and retrieved from the data storage device 110. In accordance with one embodiment of the subject application, the identification data corresponds to a given machine characteristic, e.g., the manufacturer of the device 104. The identification data is then tested so as to determine whether the identification meets the qualifications set by the POSTSCRIPT operator, e.g., whether the manufacturer of the first document rendering device 104 is an authorized manufacturer. In accordance with the subject example, the identification data retrieved from the data storage device 110 indicates that the first document rendering device 104 is an authorized device, whereupon the electronic document is selectively rendered in accordance with the remaining POSTSCRIPT operators that define the document content.

When the second document rendering device 114 receives, from the user device 124, the electronic document inclusive of the customized POSTSCRIPT operator, the operator is parsed and executed as set forth above and identification data associated with the second document rendering device 114 is retrieved from the associated data storage device 120. The retrieved identification data is then tested so as to determine whether the second document rendering device 114 is an authorized device, e.g., whether the second document rendering device 114 is manufactured by the designated manufacturer. In accordance with one embodiment of the subject application, such a determination is based upon identifying machine characteristics, as will be understood by those skilled in the art. Thus, the raster image processor, resident on the controller 118, for example, associated with the second document rendering device 114, executes the POSTSCRIPT operators to test the second document rendering device 114 identification data. As the second document rendering device 114 is not an authorized device, e.g., the identification data does not meet the qualifications set by the POSTSCRIPT operator, the output operation, e.g., the requested document processing operation, is refused. An error page is then generated by the second document rendering device 114 indicating the incompatibility of the device, e.g., the features, options, or operations, requested by the user device 124, are not authorized for the selected device. Thereafter, the error page is output to the user associated with the user device 124.

Figure 4:
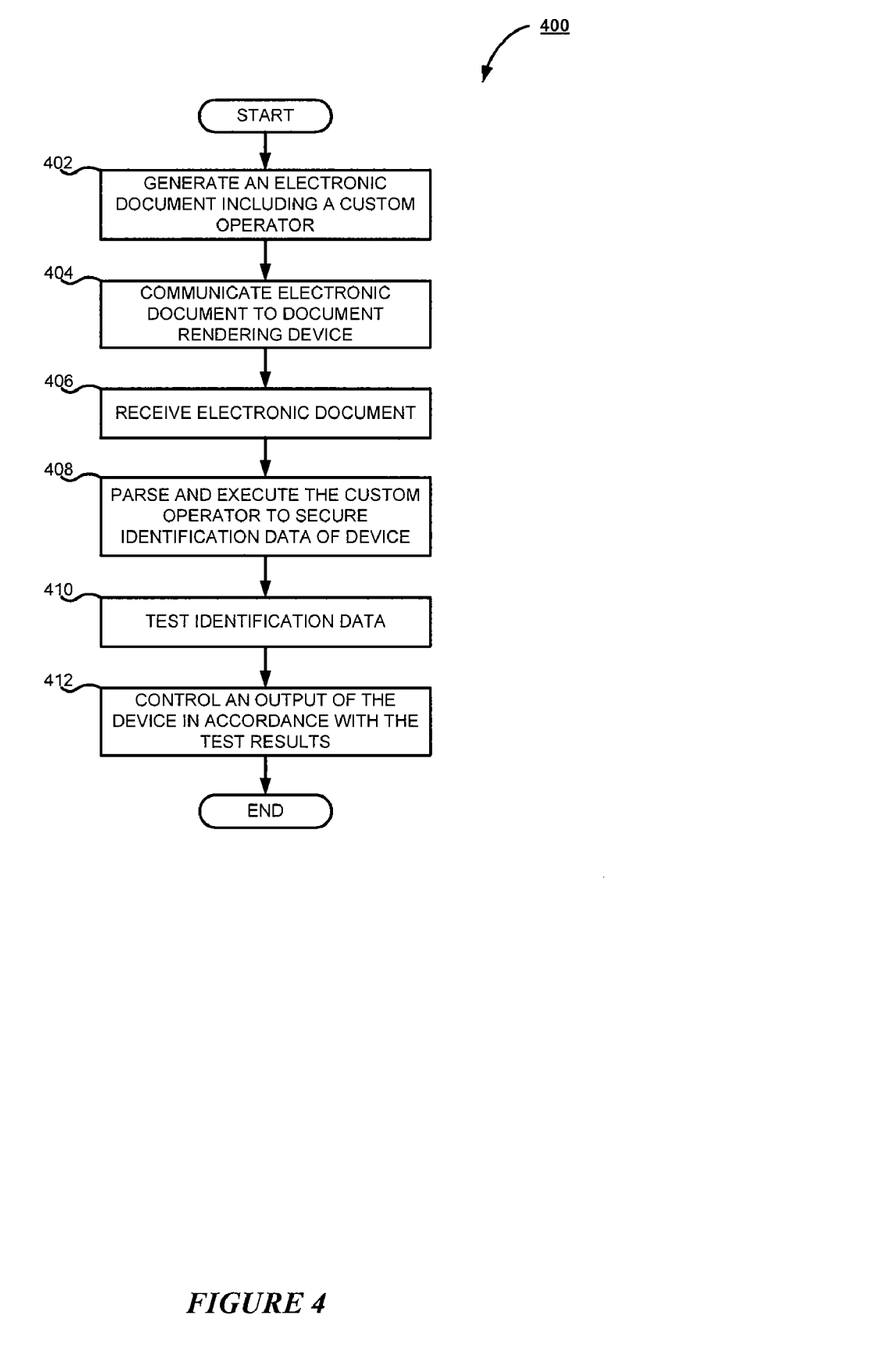
FIG. 4 is a flowchart illustrating a method for selectively disabling document rendering according to one embodiment of the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a method for selectively disabling document rendering in accordance with one embodiment of the subject application. Beginning at step 402, an electronic document is generated via the user device 124 inclusive of at least one operator. In accordance with one embodiment of the subject application, the operator corresponds to a POSTSCRIPT operator. The generated electronic document and operator are then communicated at step 404, to a selected document rendering device 104. For purposes of illustrating FIG. 4 only, reference is made hereinafter only to the first document rendering device 104.

The first document rendering device 104 then receives the communicated electronic document and operator at step 406. At step 408, a raster image processor resident on the first document rendering device 104 enables the operator so as to secure the identification data of the first document rendering device 104. In accordance with the processed operator, flow proceeds to step 410, whereupon the secured identification data is tested. An output of the first document rendering device 104 is then controlled at step 412 in accordance with an output of the test of identification data.

Figure 5:
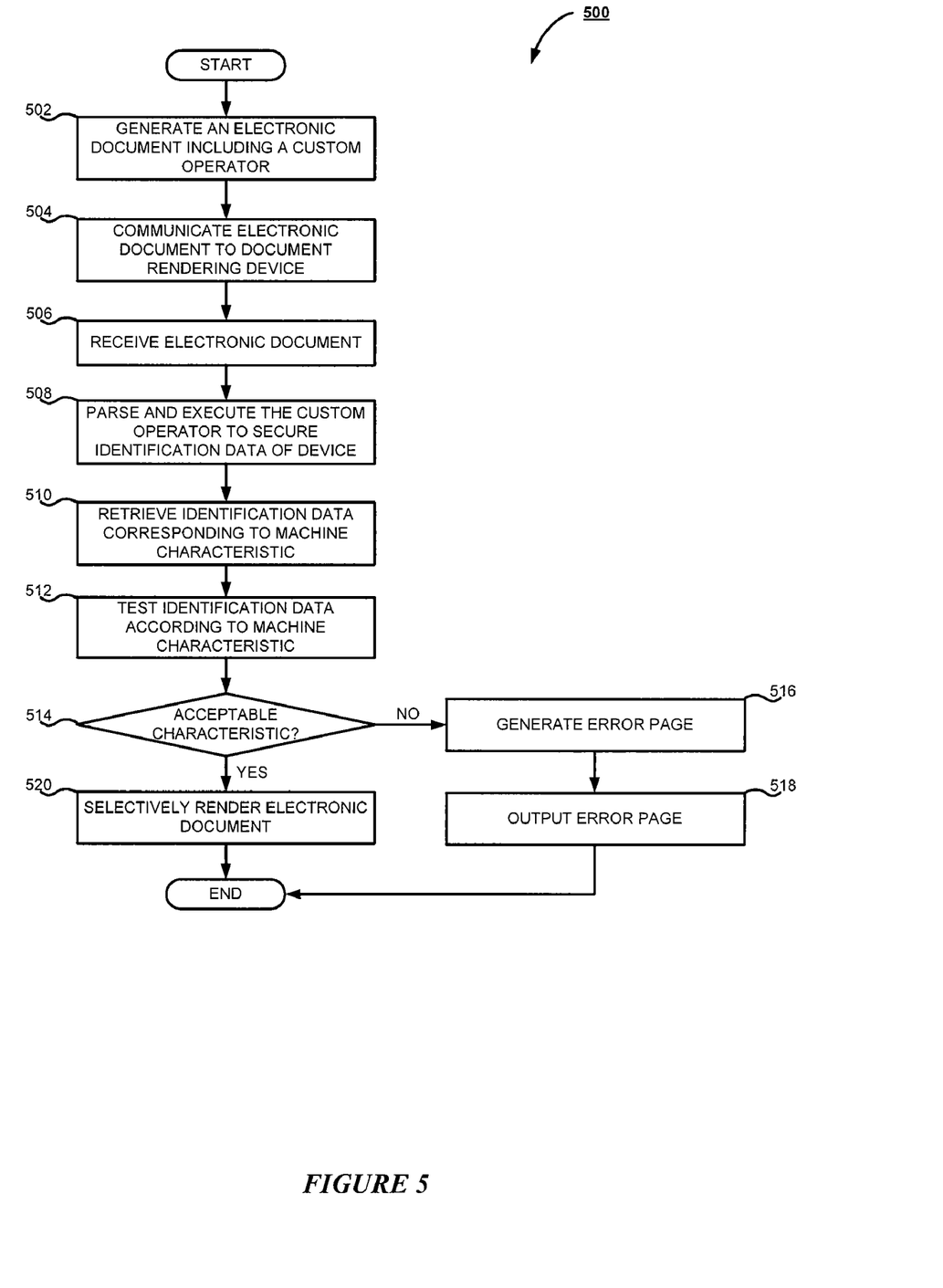
FIG. 5 is a flowchart illustrating a method for selectively disabling document rendering according to another embodiment of the subject application.

Referring now to FIG. 5, there is shown a flowchart 500 illustrating a method for selectively disabling document rendering in accordance with one embodiment of the subject application. The method illustrated in FIG. 5 begins at step 502, whereupon an application resident on the user device 124 generates an electronic document and POSTSCRIPT operator corresponding to a document processing request. It will be appreciated by those skilled in the art that such a generation is suitably facilitated via a software driver or other suitable software resident on the user device 124 and associated with the application outputting the electronic document. In accordance with one embodiment of the subject application, the driver or other suitable software enables preselected features, options, or the like, for outputting documents independent of a particular document rendering device, e.g., software-based features, options, or the like in machine-independent format. As such, control of such features, options, or the like, is facilitated via the POSTSCRIPT operator or operators included in the POSTSCRIPT print stream communicated to the selected document rendering device 104 or 114.

At step 504, the electronic document and associated POSTSCRIPT operator are communicated to the first document rendering device 104 or the second document rendering device 114 via the computer network 102. At step 506, the electronic document and associated operator are received by the first document rendering device 104 or the second document rendering device 114. The raster image processor or other suitable component associated with the receiving document rendering device 104 or 114 then enables the operator to secure identification data of the receiving device 104 or 114. That is, the raster image processor executes the POSTSCRIPT operator included with the electronic document and retrieves, at step 510, identification data from the data storage device 110 or 120 associated with the receiving document rendering device 104 or 114, respectively. In accordance with one embodiment of the subject application, the identification data corresponds to machine characteristics, such as a product identification, manufacturer, or other identifying indicators associated with the document rendering device 104 or 114.

At step 512, the identification data is tested in accordance with the received POSTSCRIPT operator so as to determine, at step 514, whether the characteristic is acceptable. That is, whether the identification data matches that which is authorized by the operator to enable the features, options, or the like corresponding to the electronic document. When it is determined at step 514 that the machine characteristics are not acceptable, e.g., the second document rendering device 114 is the recipient device and lacks suitable characteristics (unauthorized manufacturer), flow proceeds to step 516, whereupon an error page is generated indicating the incompatibility of the features and the second document rendering device 114. Thereafter the error page is output at step 518 and the operation terminates without further document processing operations being performed by the second document rendering device 114. In accordance with one embodiment of the subject application, the electronic document is then output without the manufacturer specific features specified in the POSTSCRIPT print stream.

When it is determined, at step 514, that the retrieved machine characteristics are acceptable, e.g., the first document rendering device 104 is the recipient device and is manufactured by the designated manufacturer, flow proceeds to step 520. At step 520, the electronic document is selectively rendered by the first document rendering device 104 in accordance with the POSTSCRIPT operators remaining in the print stream. That is, the operators defining content and other output parameters are processed by the raster image processor, or other suitable component of the first document rendering device 104 so as to output the electronic document in accordance with the operations requested by the user.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for selectively disabling document rendering comprising:
   means for receiving an electronic document, the electronic document including a customized operator comprising an executable command to obtain identification data to identify a manufacturer of a document rendering device;

means for enabling the customized operator so as to execute the command included in the electronic document to obtain the identification data from the document rendering device; and output control means for disabling output of the electronic document by the document rendering device if the manufacturer identified by the identification data is not a preselected manufacturer identified by the customized operator.

2. The system of claim 1 wherein the output control means includes means for outputting an error page in response to the manufacturer identified by the customized operator.

3. The system of claim 1 wherein the output control means further includes means for selectively enabling output of the electronic document if the identification data includes a preselected manufacturer identified by the customized operator.

4. The system of claim 1 wherein the electronic document is generated in POSTSCRIPT form, and wherein the customized operator is comprised of at least one customized POSTSCRIPT operator.

5. A method for selectively disabling document rendering comprising:

receiving an electronic document, the electronic document including a customized operator comprising an executable command to obtain identification data to identify a manufacturer of a document rendering device;

enabling the customized operator so as to execute the command included in the electronic document to obtain the identification data from the document rendering device; and disabling output of the electronic document by the document rendering device if the manufacturer identified by the identification data is not a preselected manufacturer identified by the customized operator.

6. The method of claim 5 wherein the disabling includes outputting an error page in response to the manufacturer identified by the identification data.

7. The method of claim 5 further comprising selectively enabling output of the electronic document if the identification data includes a preselected manufacturer identified by the customized operator.

8. The method of claim 5 wherein the electronic document is generated in POSTSCRIPT form, and wherein the customized operator is comprised of at least one customized POSTSCRIPT operator.

9. Apparatus comprising a storage medium storing a program for selectively disabling document rendering having instructions which when executed by a processor will cause the processor to:

receive an electronic document, the electronic document including a customized operator comprising an executable command to obtain identification data to identify a manufacturer of a document rendering device;

enabling the customized operator so as to execute the command included in the electronic document to obtain the identification data from the document rendering device; and disable output of the electronic document by the document rendering device if the manufacturer identified by the identification data is not a preselected manufacturer identified by the customized operator.

10. The apparatus of claim 9 wherein the instruction to disable output of the electronic document by the document rendering device if the manufacturer is not a preselected manufacturer identified by the customized operator includes an instruction to output an error page based upon the identification data.

11. The apparatus of claim 9 further comprising selectively enabling output of the electronic document if the identification data includes a preselected manufacturer identified by the customized operator.

12. The apparatus of claim 9 wherein the electronic document is generated in POSTSCRIPT form, and wherein the customized operator is comprised of at least one customized POSTSCRIPT operator.

* * * * *